Figure 1:
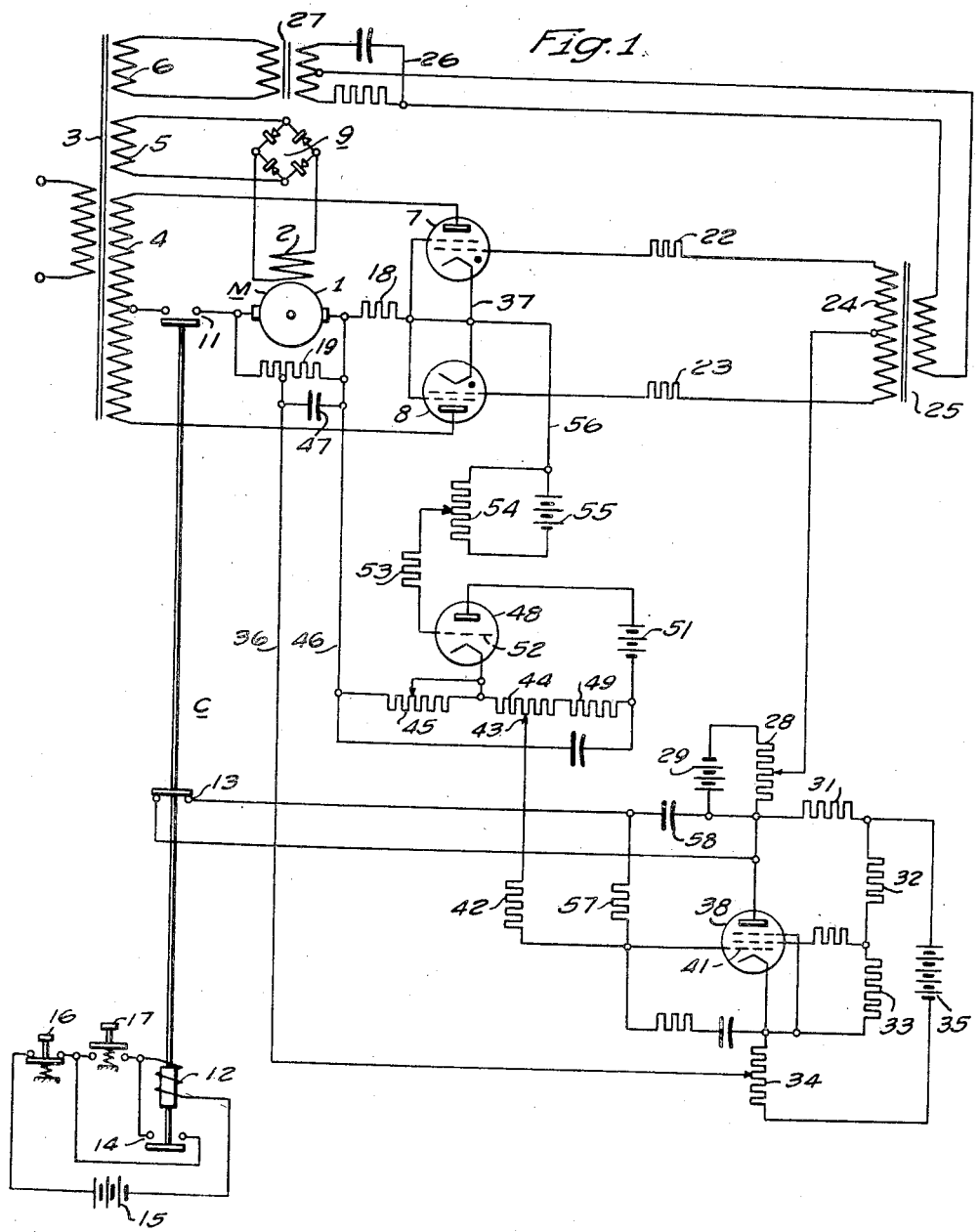

Nov. 22, 1949

J. G. HANEIKO 2,488,536

ELECTRONIC CONTROL SYSTEM FOR DIRECT-CURRENT MOTORS

Filed May 5, 1948

2 Sheets-Sheet 1

WITNESSES:

INVENTOR
John G. Haneiko.
BY
ATTORNEY

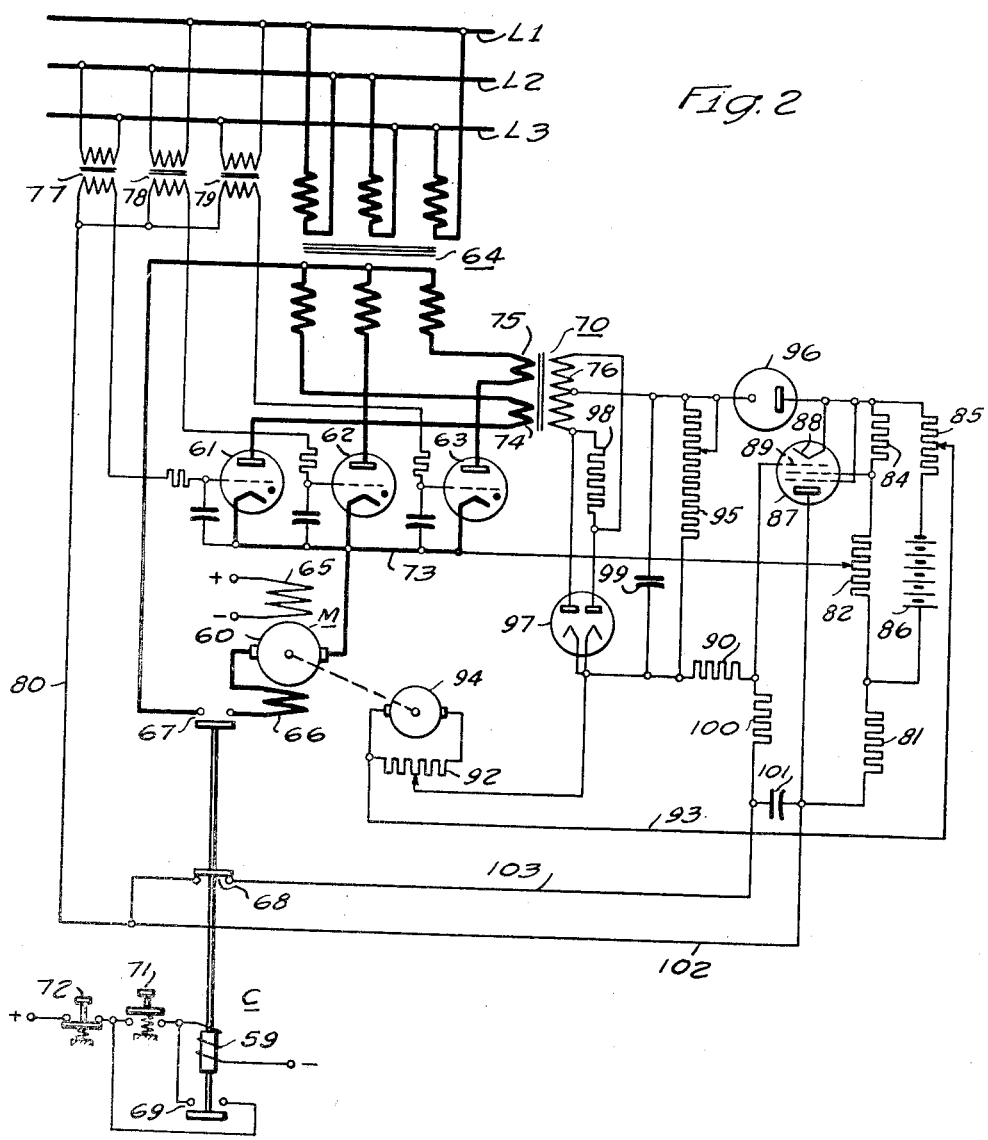

Patented Nov. 22, 1949

2,488,536

UNITED STATES PATENT OFFICE 2,488,536

ELECTRONIC CONTROL SYSTEM FOR DIRECT-CURRENT MOTORS

John G. Hanelko, East Aurora, N. Y., assignor to Westinghouse Electric Corporation, East Pittsburgh, Pa., a corporation of Pennsylvania Application May 5, 1948, Serial No. 25,156

7 Claims. (Cl. 318—345)

1

My invention relates to electronic systems for energizing direct-current motors through controlled rectifiers from an alternating-current source.

In known systems of this kind, the rectifiers are of the gaseous or arc discharge type and have a control electrode whose circuit is supplied with variable control voltage from an electronic control tube. The grid circuit of the control tube is impressed by an adjustable constant direct-current voltage indicative of a desired speed or speed-torque characteristic of the controlled motor, and includes one or several sources of variable direct-current voltage indicative of the speed or other operating magnitude of the motor to be controlled or regulated. One or several of these variable-voltage sources are connected with the load circuit of the motor, for instance, in order to vary in proportion to the terminal voltage, current, or IR drop of the armature circuit. Therefore, the ripples of the rectified voltage energizing the armature are, to some extent, transmitted to the grid circuit of the control tube even though this effect may be moderated by filtering or smoothening means.

It is an object of the invention to devise an electronic motor control system generally of the above-mentioned kind, in which the ripple voltages possibly appearing in the grid circuit of the control tube are prevented from disturbing the control of the motor. It is also an object to obtain such a suppression or elimination of ripple effects without detriment to the performance of the control tube as a direct-current amplifier.

Another object of the invention is to provide electronic motor control systems of the type mentioned with motor starting means of simpler design than heretofore available.

According to one feature of my invention, I connect a capacitor in series with a resistor across the anode and control grid of the tube (master control tube) that controls the rectifier of the electronic system. According to another feature of the invention, I equip a contactor for controlling the motor armature circuit with a contact that causes the capacitor to be short-circuited when the motor armature circuit is open and to be effective in series with the resistor when the armature circuit is closed.

These and other objects and features of the invention will be apparent from the two embodiments of motor control systems according to the invention exemplified by respective Figs. 1 and 2 of the drawings and described hereinafter.

2

In the control system shown in Fig. 1, the motor to be controlled is denoted by M, its armature by 1, and its field winding by 2. The system is energized from alternating-current terminals through a transformer 3 with secondary windings 4, 5 and 6. The motor armature 1 is energized from secondary 4 through two rectifier tubes 7 and 8, for instance, thyratrons. Tubes 7 and 8 are connected as a full-wave rectifier. The motor field winding 2 is separately excited through a rectifier 9 from the secondary winding 5.

The armature circuit of motor M is controlled by the contact 11 of a contactor C whose coil 12 also controls two contacts 13 and 14. Coil 12 is connected to a suitable source of current schematically represented at 15. The coil circuit includes a normally closed stop contact 16 and a normally open start contact 17. Closing of start contact 17 causes contactor C to pick up and to close the armature circuit of motor M while contact 14 seals the contactor in picked-up position until the stop contact 16 is opened.

A resistor 18 of low resistance is series connected with armature 1 between the rectifier tubes 7, 8 and the midpoint of the transformer secondary 4. A potentiometric resistor 19 of comparatively high resistance is connected across the armature 1.

The magnitude of the rectifier voltage and current supplied to the armature 1 through the rectifier tubes 7 and 8 depends upon the firing point of these tubes, i. e., upon the instant at which each tube starts to conduct within the half-cycle period of the anode voltage in which this voltage has the proper polarity. The firing point of the tubes is controlled by the control voltage effective in the tube control circuits.

The control circuit of tube 7 includes a resistor 22 and one half of the secondary winding 24 of a phase shift transformer 25 which is energized through a phase shift circuit 26 and an appertaining phase shift transformer 27 from the secondary winding 6 of transformer 3. The control circuit of tube 8 extends through a resistor 23 and the other half of the secondary winding 24 in the control grid transformer 25. The alternating component of control voltage impressed through the transformer 25 on the two control circuits lags about 90° behind the anode voltage of the rectifier tubes 7 and 8. Starting from the midpoint of transformer secondary 24, the two control circuits have a common portion which extends through part of a potentiometric rheostat 28 connected across a suitable direct-current source of constant voltage represented by the symbol of a battery 29. From rheostat 28 the common portion of the rectifier control circuits extends through resistors 31, 32, 33 and a tapped portion of a rheostat 34. The resistors 32, 33 and the rheostat 34 are connected across a suitable direct-current source of constant voltage schematically shown at 35. The rectifier control circuit extends further from the tap or slide contact of rheostat 34 through a lead 36 and a tapped portion of the armature shunt resistor 19 to the series resistor 18 and terminates at the common cathode lead 37 of the rectifier tubes 7 and 8.

As mentioned above, an alternating component control voltage is impressed on the grid circuit of each rectifier tube from the transformer 25. This alternating component is superimposed on several unidirectional components. One of these unidirectional components appears across the tapped portion of rheostat 28. Another unidirectional component is impressed on the rectifier control circuit across the resistors 32 and 33 from source 35. The sum of the unidirectional voltages across rheostat 28 and resistors 32 and 33 has a constant value so that these voltages together may be considered to represent a constant component grid voltage. In addition, a variable unidirectional component voltage is impressed on the control circuit by the resistor 31. This resistor is series connected in the plate circuit of a master control tube 38 consisting of an amplifying vacuum tube such as a pentode. The plate circuit of this tube is energized from across the resistors 32 and 33. The voltage across resistor 31 varies in dependence upon the conductance of the master control tube 38 and modifies the resultant control voltage and hence the grid-cathode potential of rectifier tubes 7 and 8 in the manner required for controlling the energization of the motor armature circuit.

The control circuit for rectifier tubes 7 and 8 includes also an adjustable portion of the rheostat 34 and is impressed by another unidirectional voltage from this rheostat. The rectifier control circuit also extends through a portion of the armature shunt resistor 19 and hence is impressed by still another voltage of variable magnitude. However, the order of magnitude of the voltages from rheostat 34 and resistor 19 is smaller than that of the other voltages so that the voltages across rheostat 34 and resistor 19 are negligible as to their effect on the firing conditions of the rectifier tubes 7 and 8. This is also due to that fact that these small voltages cancel each other to a large extent.

The grid circuit of control tube 38 extends from the appertaining grid 41 through a resistor 42 to the tap point 43 of a rheostat 44, thence through a resistor 45, a lead 46, and the tapped portion of the armature shunt resistor 19 to the lead 36, and through the tapped portion of the rheostat 34 to the cathode of control tube 38.

The above-mentioned rheostat 44, part of which is included in the grid circuit of control tube 38, is connected in the plate circuit of an amplifier tube 48 in series with a resistor 49. The plate circuit of tube 48 is energized from a direct-current source of constant voltage schematically indicated at 51. It will be recognized that the voltage across the tapped portion of rheostat 44 depends upon the conductance of tube 48. This conductance is controlled by a grid circuit which extends from the grid 52 of tube 48 through a resistor 53, a tapped portion of a rheostat 54 energized from a constant voltage source 55, and through a lead 56, the series resistor 18, the lead 46 and the resistor 45 to the cathode of tube 48.

The above-mentioned grid circuit for the master control tube 38 includes three sources of unidirectional voltage. One voltage is impressed on the grid circuit across the tapped portion of rheostat 34. The magnitude of this voltage depends upon the adjustment of the rheostat slider or contact and determines the speed at which the motor M is supposed to run.

A second component grid voltage for master control tube 38 appears across the tapped portion of resistor 19. This second component is proportional to the armature terminal voltage. Although the armature voltage usually contains a distinct ripple, the second component grid voltage taken from across the resistor 19 is smoother due to the filtering effect of a shunt connected capacitor 47.

The third component grid voltage for the master control tube 38 appears across the tapped off portion of the rheostat 44. This third component voltage is variable under control by the grid circuit of tube 48. However, the magnitude of this voltage is small as compared with the adjusted voltage from rheostat 34 and the variable voltage from resistor 19. Consequently, the conductivity of the master control tube 38 is primarily determined by the setting of the rheostat 34 and by the motor armature voltage effective across the resistor 19.

When the motor is running at a certain speed depending upon the selected adjustment of rheostat 34, the voltage across the active portion of the rheostat 34 and the voltage of opposite polarity across resistor 19 balance each other so that a resulting negative voltage of a few volts is applied to the control grid 41 of tube 38. This resulting grid voltage corresponds to a definite voltage across the load resistor 31 of tube 38 and thus to a definite firing point of the rectifier tubes 7 and 8. When the slider of speed control rheostat 34 is moved away from the cathode of tube 38, the voltage balance is momentarily disturbed. The grid 41 becomes more negative and the voltage across resistor 31 decreases thus advancing the firing angle of the rectifier tubes 7, 8. This results in an increase in armature voltage and, consequently, in the speed of motor M. The armature voltage and speed increase to such a degree that a new balance of the system is established at a slightly more negative resultant grid voltage on tube 38. Conversely, the speed of the motor decreases when the slider of rheostat 34 is moved in the opposite direction.

Turning now to the effect of the corrective grid voltage taken from the rheostat 44 in the plate circuit of tube 48, it should be understood that a definite selected adjustment of the control rheostat 34 would correspond to a definite motor speed only if the IR drop in the motor armature circuit remained constant, or if the motor had no drooping speed-torque characteristic. With separately excited or shunt-excited direct-current motors, however, not only the armature terminal voltage changes but also the armature current and the IR drop if the load or torque imposed on the motor is varied. Therefore, the voltage taken from the active portion of rheostat 44 serves to correct the motor speed for any departures from the desired value due to IR drop variations. To this end, the grid voltage for amplifier tube 48 is varied in proportion to the IR drop or current in the armature circuit.

The IR drop is measured by the series resistor 18 which develops a voltage drop proportional to the load current. The resistor 18 is included in the above-mentioned grid circuit for tube 48. In addition, a constant biasing voltage is imposed on this grid circuit from the rheostat 54. As a result, the voltage across the rheostat 44 varies to an amplified extent in proportion to the IR drop in the motor armature circuit.

The corrective voltage taken from the tapped-off portion of rheostat 44 is cumulative to the speed adjusting voltage taken from rheostat 34. Consequently, when the torque on the motor is increased, thus resulting in an increased IR drop, the effect of the corresponding increase in corrective grid voltage tapped off from rheostat 44 is the same as if the rheostat 34 had been set for a higher speed. The correction is such that the motor speed remains at the desired value regardless of changes in load.

It will be recognized that in the system of Fig. 1, a ripple voltage may appear in the grid circuit of the master control tube 38 due to the fact that the voltage across resistor 19 and the voltage across rheostat 44 are primarily derived from the motor armature circuit. The remaining ripple must be put up with unless the design of the filtering means is to become rather complicated and costly.

However, a detrimental effect of such remaining ripples on the control performance is eliminated by the functioning of a resistor 57 and a capacitor 58 connected in series with each other across the anode and control grid 41 of the master control tube 38. This cross connection represents a negative feedback circuit which reduces the gain of tube 38 as an alternating-current amplifier but does not disturb its action as a direct-current amplifier. Consequently, the unidirectional magnitudes of the resultant grid voltage applied to the grid circuit of tube 38 are amplified to a much larger extent than any voltage ripples. In this manner, the stability of the control and regulating performance is greatly increased in a simple manner and a good tube balance is obtained at all speeds and loads of the motor.

When the contactor C is deenergized and the motor M at standstill, the capacitor 58 is short-circuited by the contact 13, and the grid 41 of tube 38 is connected to the anode through the resistor 57 and through contact 13. Consequently, the tube 38 is now conducting full current so that the control voltage across resistor 31 is a maximum and a high negative blocking voltage is impressed on the control electrodes of the rectifier tubes 7 and 8. When the start contact 17 is actuated and the contactor C picks up and closes the armature circuit at contact 11, capacitor 58 becomes effective in series connection with resistor 57. As a result, the capacitor 58 is charged and thereby delays the dropping of the plate current of tube 38. As a result, the system operates inherently also as a starting circuit which causes the control voltage across resistor 31 to decline slowly and thus prevents high peak currents in the motor armature circuit during the first few cycles of the starting current. After capacitor C is fully charged, the system begins its aboved-mentioned normal operation and, as mentioned, the same capacitor in combination with the resistor 57 is then effective to stabilize the effect of voltage ripples.

In the embodiment illustrated in Figure 2, the armature 60 of a direct-current motor M receives rectified current through thyratrons 61, 62, 63 energized through a three-phase transformer 64 from the leads L1, L2 and L3 of an alternating-current line. The motor has a separately excited field winding 65, energized by constant voltage from a suitable direct-current source (not shown), and a series field winding 66. The armature circuit is controlled by the contact 67 of a contactor C with two additonal contacts 68 and 69. The control coil 59 of contactor C is connected to current supply means through a normally open start contact 71 and a normally closed stop contact 72. Actuation of contact 71 causes contactor C to pick up and to seal itself in until stop contact 72 is opened.

The thyratrons 61, 62, 63 have a common cathode lead 73. The plates of tubes 61 and 63 are series connected with respective primary windings 74 and 75 of a transformer with a midtapped secondary winding 76.

The control grids of tubes 61, 62, 63 are connected to respective grid transformers 77, 78, 79 which are energized from the alternating-current line in such a phase relation and phase sequence as to impart to each grid an alternating potential of proper phase displacement relative to the alternating anode voltage of the appertaining rectifier tube. The control circuits of tubes 61, 62, 63 have a common lead 80 and extend jointly through a resistor 81 and a tapped portion of a rheostat 82 to the common cathode lead 73. Resistor 82 is series connected with a resistor 84 and a rheostat 85 across a direct-current source 86 of constant voltage. Consequently, a constant potential of adjusted magnitude is impressed across the portion of resistor 82 that is included in the control circuit of the rectifier tubes, and this constant potential is superimposed on the above-mentioned alternating potential. Thus, the resistor 81 provides the control circuit with a variable unidirectional voltage which determines the firing angle of the rectifier tubes.

Resistor 81 is connected in the plate circuit of a master control tube 87 which operates as an amplifier. The plate circuit of tube 87 extends from the tube anode through resistors 81, 82 and 84 to the cathode 88. The constant voltage drop caused by source 86 across resistors 82 and 84 provides plate excitation for control tube 87. The voltage drop across resistor 81 depends upon the conductivity of tube 87 which is varied under control by the appertaining grid circuit.

The grid circuit for control tube 87 can be traced from grid 89 through resistor 90, a tapped portion of a rheostat 92 to a lead 93 which is connected through a tapped portion of rheostat 85 to the cathode 88. Rheostat 92 is connected across a pilot generator 94 which is driven from the armature 60 of motor M or from machinery that is driven by the motor M and is to operate at a controlled speed.

Rheostat 85 impresses on the grid circuit an adjusted voltage indicative of the desired operating speed. The active portion of rheostat 92 impresses on the grid circuit a voltage in opposition to that from rheostat 85 and proportional to the speed to be controlled. Both voltages balance each other to such an extent that the resultant control potential between grid 89 and cathode 88 has the value needed for adjusting the control circuit and firing angle of the rectifier tubes 61, 62, 63 in accordance with the desired motor speed as adjusted at rheostat 85.

In order to prevent the armature current of motor M from exceeding a given safe limit value, a current limiting device is provided. This device comprises a rheostat 95 which is series connected with a cold cathode tube 96 between the cathode 88 and grid resistor 80 of the master control tube 87. The rheostat 95 is connected to a rectifier, shown as a twin diode 97, which is energized from the secondary 76 of transformer 70. A load resistor is shown at 98 and a filtering or smoothing capacitor at 99.

Since the secondary transformer winding 76 is energized by primary windings 74 and 75 in accordance with the rectified current applied to the motor armature 60, the rectified output voltage impressed across the rheostat 95 is proportional to the motor armature current. When this voltage remains below a given limit value, the above-described control performance of the system remains undisturbed. However, when the armature current and the voltage across rheostat 95 become so large that the voltage across the electrodes of tube 96 to exceed the breakdown voltage of this tube, the tube becomes conductive. As a result, the cathode-grid potential of tube 87 is changed to increase the voltage across resistor 81 for decreasing the firing angle of the rectifier tubes. In this manner, the control system is automatically prevented from increasing the motor load current beyond a safe value adjusted by the selected setting of rheostat 95. This feature is also disclosed in the copending application Serial No. 45,284 filed August 20, 1948 of W. G. Roman and R. C. Cunningham assigned to the assignee of the present invention.

Due to the fact that the current limiting device of the system obtains its excitation from the armature circuit of the motor, a voltage ripple may appear in the grid circuit of the master control tube 87. However, the resistor 100 and capacitor 101, series connected with each other across anode and control grid of the master control tube, prevent such ripples from affecting the stability of the voltage impressed across the resistor 81. Contact 68 of contactor C is connected across the capacitor 101 so that the capacitor is short-circuited when the armature circuit of the motor is open. Consequently, when the motor is at standstill, the anode of control tube 87 is connected to the grid 89 through lead 103, contact 68, lead 102, and resistor 100. This causes a high positive potential to be effective at the grid which causes the resistor 81 to carry maximum current in order to block the rectifier tubes 61, 62, 63 from conducting. When the contactor C is closed, a short-circuit of capacitor 101 is eliminated so that the capacitor causes an increase in charge and thereby prevents the grid potential of tube 87 and the voltage across resistor 81 from changing too rapidly. In this manner, the system operates to automatically prevent high current peaks during the starting interval of the motor. At the end of this interval the above-described current limiting device takes over to prevent undue current loads during the subsequent performance.

It will be recognized upon a study of this disclosure that systems according to the invention can be modified and altered in various respects without departing from the objects and essence of the invention and without departing from the features of the invention set forth in the claims annexed hereto.

I claim as my invention:

1. An electronic control system, comprising alternating-current supply means, a direct-current motor having a motor circuit, a controllable rectifier tube connecting said motor circuit to said supply means and having a control circuit, an amplifying control tube having an anode and having a load resistor connected with said anode and disposed in said control circuit to impress variable control voltage on said control circuit, said control tube having a grid circuit for controlling said variable control voltage, a direct-current source of adjustable grid voltage connected with said grid circuit, circuit means connected to said motor circuit and disposed in said grid circuit to control said grid circuit in dependence upon a condition of said motor circuit, a resistor and a capacitor connected in series with each other across said anode and said grid circuit for reducing the effect of voltage ripples from said motor circuit on said variable control voltage.

2. An electronic control system, comprising alternating-current supply means, a direct-current motor having a motor circuit, a controllable rectifier tube connecting said motor circuit to said supply means and having a control circuit, an amplifying control tube having an anode and having a load resistor connected with said anode and disposed in said control circuit to impress variable control voltage on said control circuit, said control tube having a grid circuit for controlling said variable control voltage, a direct-current source of adjustable grid voltage connected with said grid circuit, circuit means connected to said motor circuit and disposed in said grid circuit to control said grid circuit in dependence upon a condition of said motor circuit, a resistor and a capacitor connected in series with each other across said anode and said grid circuit, a contact device having a first contact disposed in said motor circuit for opening and closing said motor circuit and having a second contact connected across said capacitor only when said motor circuit is open.

3. An electronic control system, comprising alternating-current supply means, a separately excited direct-current motor having an armature circuit, a controllable rectifier tube connecting said armature circuit to said supply means and having a control circuit, an amplifying control tube having an anode and having a load resistor connected with said anode and disposed in said motor circuit to impress variable control voltage on said control circuit, said control tube having a grid circuit for controlling said variable control voltage, a direct-current source of adjustable grid voltage connected with said grid circuit, a resistor connected with said armature circuit to produce a voltage drop in accordance with an electric current magnitude of said armature circuit, said resistor being connected with said grid circuit to impose thereon a control effect due to said voltage drop, and another resistor and a capacitor connected in series with each other across said anode and said grid circuit.

4. An electronic control system, comprising alternating-current supply means, a separately excited direct-current motor having an armature circuit, a contactor having a contact series connected in said armature circuit to open and close the latter, a controllable rectifier tube connecting said armature circuit to said supply means and having a control circuit, an amplifying control tube having an anode and having a load resistor connected with said anode and disposed in said motor circuit to impress variable control voltage on said control circuit, said control tube having a grid circuit for controlling said variable control voltage, a direct-current source of adjustable grid voltage connected with said grid circuit, a resistor connected with said armature circuit to produce a voltage drop in accordance with an electric current magnitude of said armature circuit, said resistor being connected with said grid circuit to impose thereon a control effect due to said voltage drop, another resistor and a capacitor connected in series with each other across said anode and said grid circuit, said contactor having another contact connected across said capacitor for shorting said capacitor when said motor circuit is open.

5. An electronic control system, comprising alternating-current supply means, a separately excited direct-current motor having an armature circuit, a controllable rectifier tube connecting said armature circuit to said supply means and having a control circuit, an amplifying control tube having an anode and having a load resistor connected with said anode and disposed in said control circuit to impress variable control voltage on said control circuit, said control tube having a grid circuit for controlling said variable control voltage, a direct-current source of adjustable grid voltage connected with said grid circuit, a source of variable grid voltage controlled by said motor and connected with said grid circuit to oppose said adjustable grid voltage in dependence upon an operating condition of said motor, a resistor and a normally non-conductive valve of a given breakdown voltage connected in series with each other between the cathode of said control tube and a point of said grid circuit, circuit means connecting said resistor with said armature circuit to impress on said resistor a voltage drop in accordance with the current flowing in said armature circuit in order to render said valve conductive when said current exceeds a given limit value, whereby said conductive valve causes said grid circuit to vary said control voltage for reducing said current.

6. In a system according to claim 5, another resistor and a capacitor being connected in series with each other across said grid circuit and said anode of said control tube for stabilizing the effect of ripple voltage on said variable control voltage.

7. In a system according to claim 6, a contactor having a contact series-connected in said armature circuit for opening and closing said armature circuit and having another contact connected across said capacitor for shorting said capacitor when said armature circuit is open.

JOHN G. HANEIKO.

No references cited.